H. F. PECK.
FLUID CONDUCTING FITTING.
APPLICATION FILED JULY 13, 1920.
1,368,196.
Patented Feb. 8, 1921.
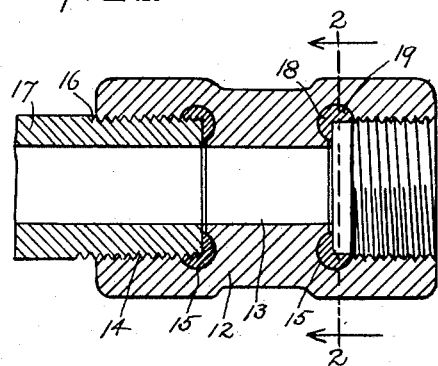
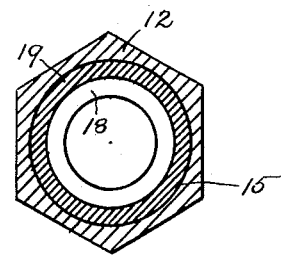
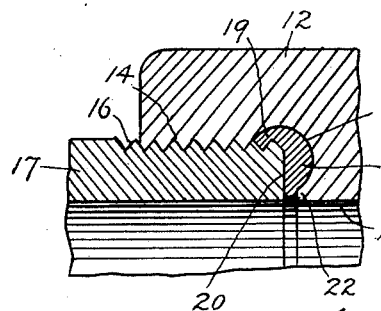
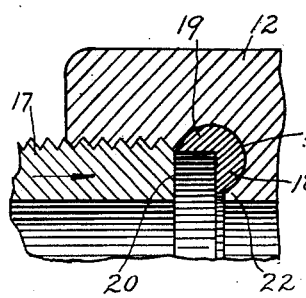
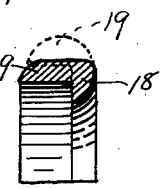
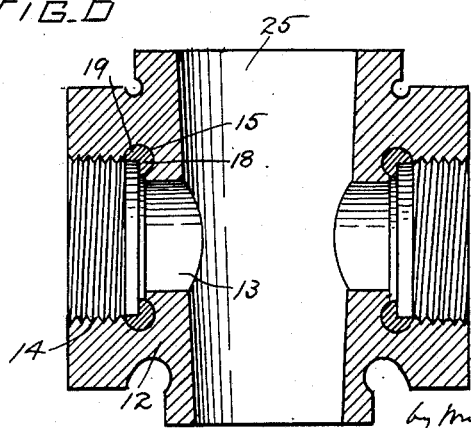
INVENTOR:
H. F. Peck
by Wright Brown Quinby & May
ATT'YS.

UNITED STATES PATENT OFFICE.

HARRY F. PECK, OF WAKEFIELD, MASSACHUSETTS.

FLUID-CONDUCTING FITTING.

1,368,196. Specification of Letters Patent. Patented Feb. 8, 1921.

Application filed July 13, 1920. Serial No. 395,952.

*To all whom it may concern:*

Be it known that I, HARRY F. PECK, a citizen of the United States, residing at Wakefield, in the county of Middlesex and State of Massachusetts, have invented new and useful Improvements in Fluid-Conducting Fittings, of which the following is a specification.

This invention relates particularly to fluid-conducting means including a fitting having an internal thread and forming a conduit element, and an entering member forming another conduit element and having an external thread engageable with the internal thread of the fitting.

The invention has for its object to provide a fitting having a compressible packing-ring, adapted to have a fluid-tight bearing simultaneously on the externally threaded periphery and on the end face of an entering member.

The invention is embodied in the improvements hereinafter described and claimed.

Of the accompanying drawings forming a part of this specification,—

Figure 1 shows in longitudinal section a fitting embodying the invention, and a portion of an entering member engaged therewith.

Fig. 2 is a section on line 2—2 of Fig. 1.

Fig. 3 is an enlargement of a portion of Fig. 1.

Fig. 4 is a view similar to Fig. 3, showing the packing-ring as originally formed.

Fig. 5 is a fragmentary view, showing a portion of the packing-ring in section.

Fig. 6 is a longitudinal section of another form of fitting embodying the invention.

The same reference characters indicate the same parts in all of the figures.

In the drawings, 12 represents a fitting having a contracted inner bore portion 13, an outer bore portion 14, having an internal thread and of larger diameter than the portion 13, and an intermediate annular groove 15, concentric with said bore portions. The wall of the groove 15 has an inner portion facing the outer end of the bore portion 14, and an outer portion facing the longitudinal axis of the fitting and formed to surround and be spaced from portions of an external thread 16 on an entering member 17.

In said groove is inserted a soft metal packing ring, preferably of lead, said ring including an annular body 18 seated on the inner portion of the groove wall, and an annular flange 19, seated on the outer portion of the groove wall. The ring may be formed in cross section as shown by Fig. 5, so that it may be forced through the larger bore portion 14, and then expanded by a suitable instrumentality, until it has the form in cross section shown by Fig. 4, and in part by dotted lines in Fig. 5, and conforms to the groove wall.

The ring flange 19 when in the condition shown by Fig. 4, is adapted to be entered and internally screw-threaded, as shown by Fig. 3, by portions of the external thread 16 of the entering member 17. The ring body 18 is adapted to be compressed between the annular end face 20 of the entering member and a portion of the wall of the groove 15, so that when the entering member is in place, the packing-ring has a fluid-tight bearing on a portion of the threaded periphery and on the end face of the entering member, whereby an angular joint is formed, having ample area to prevent leakage between the fitting and the entering member.

The depth of the portion of the groove which receives the flange 19 is greater than the depth of the screw-threads 16, and the inner face of the flange 19 is substantially flush with the outer angles of the internal thread convolutions in the bore portion 14, so that portions of the entering member thread 16 are caused to cut their way into the flange 19 and are entirely embedded therein. The portion of the groove 15 which receives the body 18 is preferably undercut to form an annular lip 22 projecting within a portion of the inner face of the body. The material of the ring displaced by the thread of the entering member may become a part of the body portion 18, and cause the body portion to protrude between the lip 22 and the annular face 20 of the entering member.

The fitting, which is shown by Fig. 1, as a pipe-coupling, may be formed as a valve body or casing having a tapered seat 25 for a plug valve, as shown by Fig. 6.

I claim:

A fitting of the character stated, having a contracted inner bore portion, an outer bore portion of larger diameter than the contracted portion, and provided with an internal thread, and an intermediate annular groove, concentric with said bore portions, the wall of said groove having an inner portion facing the outer end of the threaded bore portion, and an outer portion facing the longitudinal axis of the fitting and formed to surround and be spaced from portions of an external thread on an entering member engaged with the said internal thread, and a soft metal packing-ring having an annular body seated on said inner wall portion and an annular flange seated on said outer wall portion, the inner face of said flange being substantially flush with the outer angles of the internal thread convolutions in the outer bore portion, so that said flange is adapted to be internally threaded by the external thread of said entering member, and the ring body being adapted to be compressed between the annular end face of the entering member and the inner portion of the groove wall, so that the ring has a fluid-tight bearing on a portion of the threaded periphery and on the annular end face of the entering member.

In testimony whereof I have affixed my signature.

HARRY F. PECK